US012607587B2

(12) United States Patent (10) Patent No.: US 12,607,587 B2
Ogawa (45) Date of Patent: Apr. 21, 2026

(54) POTENTIAL MEASURING DEVICE

(71) Applicant: SONY SEMICONDUCTOR SOLUTIONS CORPORATION, Kanagawa (JP)

(72) Inventor: Koji Ogawa, Zurich (CH)

(73) Assignee: Sony Semiconductor Solutions Corporation, Kanagawa (JP)

( * ) Notice: Subject to any disclaimer, the term of this patent is extended or adjusted under 35 U.S.C. 154(b) by 300 days.

(21) Appl. No.: 18/042,438

(22) PCT Filed: Aug. 24, 2021

(86) PCT No.: PCT/JP2021/030884
§ 371 (c)(1),
(2) Date: Feb. 21, 2023

(87) PCT Pub. No.: WO2022/050118
PCT Pub. Date: Mar. 10, 2022

(65) Prior Publication Data
US 2023/0333040 A1 Oct. 19, 2023

(30) Foreign Application Priority Data

Sep. 7, 2020 (JP) ................................. 2020-149729

(51) Int. Cl.
G01N 27/30 (2006.01)
G01N 27/416 (2006.01)

(52) U.S. Cl.
CPC ....... G01N 27/301 (2013.01); G01N 27/4163 (2013.01)

(58) Field of Classification Search
CPC ............. G01N 27/301; G01N 27/4163; G01N 33/4836; H10D 84/00; H10D 84/01;
(Continued)

(56) References Cited

U.S. PATENT DOCUMENTS 6,833,869 B1 * 12/2004 Okamoto ............... H04N 25/77
348/E3.029
2004/0207384 A1 10/2004 Brederlow et al.
(Continued)

FOREIGN PATENT DOCUMENTS

JP H09-246880 9/1997
JP 2017-110978 6/2001
(Continued)

OTHER PUBLICATIONS

International Search Report and Written Opinion prepared by the Japan Patent Office on Oct. 12, 2021, for International Application No. PCT/JP2021/030884, 3 pgs.
(Continued)

*Primary Examiner* — Lee E Rodak
*Assistant Examiner* — Zannatul Ferdous
(74) *Attorney, Agent, or Firm* — SHERIDAN ROSS P.C.

(57) ABSTRACT

The present technology relates to a potential measuring device capable of acquiring a signal of low-frequency bands of approximately 1 Hz to 300 Hz. The potential measuring device includes: a unit cell that includes a readout electrode for reading a predetermined potential as a displacement with respect to a reference potential, an amplifier circuit that includes a common-source amplifier, the readout electrode being connected to an input node of the common-source amplifier, a predetermined bias voltage being applied to the input node via a resistor, and a buffer circuit that is connected to an output node of the amplifier circuit. The present technology is applicable to, for example, a device for measuring the potential of a solution on a microelectrode.

20 Claims, 16 Drawing Sheets

(58) Field of Classification Search
CPC .. H10D 84/0126; H10D 84/038; H10D 84/83;
H10D 99/00; H03F 1/226
See application file for complete search history.

(56) References Cited

U.S. PATENT DOCUMENTS

| | | | |
|---|---|---|---|
| 2009/0174483 A1 | 7/2009 | Hesen et al. | |
| 2012/0001056 A1 | 1/2012 | Fife et al. | |
| 2016/0164517 A1* | 6/2016 | Sharma ................. | H10D 84/83 |
| | | | 327/108 |
| 2017/0168010 A1 | 6/2017 | Nagai et al. | |
| 2018/0348161 A1 | 12/2018 | Ogi et al. | |
| 2019/0014273 A1* | 1/2019 | Geurts ................ | H04N 25/583 |
| 2019/0057997 A1* | 2/2019 | Togashi ................ | H10D 84/83 |
| 2019/0268496 A1* | 8/2019 | Nakazawa .............. | H04N 5/00 |
| 2020/0046240 A1* | 2/2020 | Angle ................... | A61B 5/291 |
| 2020/0116780 A1* | 4/2020 | Kawahara .............. | H01L 24/06 |
| 2022/0008034 A1* | 1/2022 | Sato ..................... | B06B 1/0215 |

FOREIGN PATENT DOCUMENTS

| | | |
|---|---|---|
| JP | 2002-031617 | 1/2002 |
| JP | 2004-534254 | 11/2004 |
| JP | 2009-538552 | 11/2009 |
| JP | 2015-210233 | 11/2015 |
| JP | 2016-122009 | 7/2016 |
| JP | 2017-061171 | 3/2017 |
| WO | WO 2019/082894 | 5/2019 |

OTHER PUBLICATIONS

Obien et al., "Revealing neuronal function through microelectrode array recordings," Frontiers In Neuroscience, vol. 8, No. 423, Jan. 2015, 30 pages.

* cited by examiner

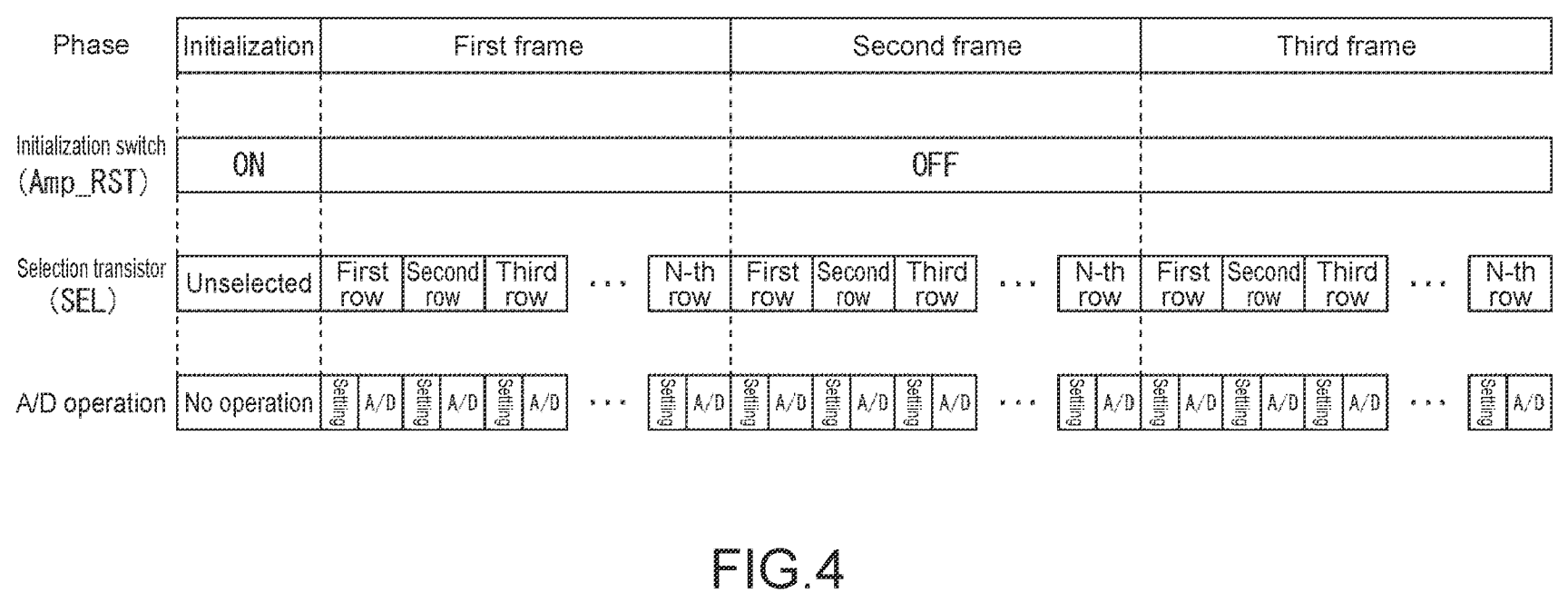

| Phase | Initialization | First frame | | | | | Second frame | | | | | | Third frame | | | | | |
|---|---|---|---|---|---|---|---|---|---|---|---|---|---|---|---|---|---|---|
| | | | First row | Second row | Third row | ... | N-th row | | First row | Second row | Third row | ... | N-th row | | First row | Second row | Third row | ... | N-th row |
| Initialization switch (Amp_RST) | ON | | | | | | OFF | | | | | | | | | | | | |
| Selection transistor (SEL) | Unselected | | | | | | | | | | | | | | | | | | |
| A/D operation | No operation | Settling | A/D | Settling | A/D | Settling | A/D | ... | Settling | A/D | Settling | A/D | Settling | A/D | Settling | A/D | ... | Settling | A/D | Settling | A/D | Settling | A/D | ... | Settling | A/D |

FIG.4

POTENTIAL MEASURING DEVICE

CROSS REFERENCE TO RELATED APPLICATIONS

This application is a national stage application under 35 U.S.C. 371 and claims the benefit of PCT Application No. PCT/JP2021/030884, having an international filing date of 24 Aug. 2021, which designated the United States, which PCT application claimed the benefit of Japanese Patent Application No. 2020-149729, filed 7 Sep. 2020, the entire disclosures of each of which are incorporated herein by reference.

TECHNICAL FIELD

The present technology relates to a potential measuring device and particularly to a potential measuring device capable of acquiring a signal of low-frequency bands of approximately 1 Hz to 300 Hz.

BACKGROUND ART

There is a device in which microelectrodes are arranged in an array and the potential of a solution on the microelectrodes is measured. Among such devices, there is a device in which a culture solution is poured onto the microelectrode, a living cell is placed thereon, and the action potential generated by the living cell is generated (see, for example, Patent Literature 1). Particularly in recent years, attention has been focused on a device in which an electrode, an amplifier, an AD converter, and the like, are integrated into one chip and a potential is simultaneously measured at multiple points, using a CMOS (Complementary Metal Oxide Semiconductor) integrated circuit technology (see, for example, Non-Patent Literature 1).

In such a service, it is presumably necessary to achieve a sampling rate of approximately 10 kHz or more and then perform low-noise measurement in the order of several V, considering the acquisition of an action potential (AP) of a neuron. Further, in order to acquire signal propagation in a neuronal network in detail and in a broad range, it is necessary to set the electrode size to approximately 10 m square and densely arrange electrodes to achieve high resolution. There are trade-off relationships between lower noise, higher sampling rate, and higher resolution, and various proposals have been made in circuit architecture to overcome the trade-offs (see, for example, Non-Patent Literature 1).

A configuration in which one amplifier circuit region (reference cell) constituting a differential amplifier circuit is separated from the other amplifier circuit region (readout cell) that reads a signal received by the electrode while each electrode includes the differential amplifier circuit has been proposed as one of promising methods for achieving lower noise and higher resolution (see, for example, Patent Literature 2). In accordance with this separation configuration, since the number of components required in the readout cell region can be minimized and the area of the amplifier transistor can be increased without increasing the size of the readout cell, it is possible to achieve both high resolution and low noise.

CITATION LIST

Patent Literature

Patent Literature 1: Japanese Patent Application Laid-open No. 2002-31617

Patent Literature 2: WO 2019/082894

Non-Patent Literature

Non-Patent Literature 1: M. Obien, et al., "Revealing neuronal function through microelectrode array recordings", Frontiers in Neuro Science Vol. 8 (2015) Article 423

DISCLOSURE OF INVENTION

Technical Problem

Incidentally, the signal emitted by a neuron is not limited to the action potential AP and it is desirable that other signals can be simultaneously acquired. For example, when a local field potential (LFP), which is a lower frequency signal, can be simultaneously acquired in addition to the action potential AP whose signal frequency band is relatively high, i.e., approximately 300 Hz to 10 kHz, more useful information can be presumably acquired in analyzing the activity of neurons. The signal frequency band of this local field potential LFP is approximately 1 Hz to 300 Hz.

In the separation configuration disclosed in Patent Literature 2, in the reference cell, a reference potential is held by a sample-and-hold capacitor in the reference cell. Since a considerable amount of leakage current is generated in this sample-and-hold capacitor and the operating point shifts over time, it is necessary to perform an operation of refreshing the reference potential (hereinafter, referred to as the auto-zero (AZ) operation) at regular intervals. As a result, in the separation configuration proposed in Patent Literature 2, it is thought that a signal of a frequency band lower than the frequency of the auto-zero operation cannot be acquired and typically, only a signal of a frequency up to approximately 100 Hz can be acquired as a signal of a low frequency.

The present technology has been made in view of the above-mentioned circumstances and it is an object thereof to make it possible to acquire, for example, a signal of low-frequency bands of approximately 1 Hz to 300 Hz.

Solution to Problem

A potential measuring device according to a first aspect of the present technology includes: a unit cell that includes a readout electrode for reading a predetermined potential as a displacement with respect to a reference potential, an amplifier circuit that includes a common-source amplifier, the readout electrode being connected to an input node of the common-source amplifier, a predetermined bias voltage being applied to the input node via a resistor, and a buffer circuit that is connected to an output node of the amplifier circuit.

In the first aspect of the present technology, a unit cell in which a readout electrode for reading a predetermined potential as a displacement with respect to a reference potential is connected to an input node of a common-source amplifier, a predetermined bias voltage is applied to the input node via a resistor, and a buffer circuit is connected to an output node of the amplifier circuit is provided.

The potential measuring device may be an independent device or may be a module to be incorporated into another apparatus.

BRIEF DESCRIPTION OF DRAWINGS

FIG. 4 is a timing chart describing an operation of the potential measuring device.

MODE(S) FOR CARRYING OUT THE INVENTION

Hereinafter, embodiments for carrying out the present technology (hereinafter, referred to as embodiments) will be described with reference to the accompanying the drawings. Note that in the present specification and drawings, components having substantially the same functional configuration are denoted by the same reference symbols and thus, redundant description is omitted. Description will be made in the following order.

1. First embodiment of potential measuring device (configuration example of one substrate)
2. Comparison with separation configuration disclosed in Patent Literature 2
3. Second embodiment of potential measuring device (configuration example of stacked structure of two substrates)
4. Third embodiment of potential measuring device (configuration example in which readout cell includes independent a readout signal line)
5. Conclusion

1. FIRST EMBODIMENT OF POTENTIAL MEASURING DEVICE

Figure 1:
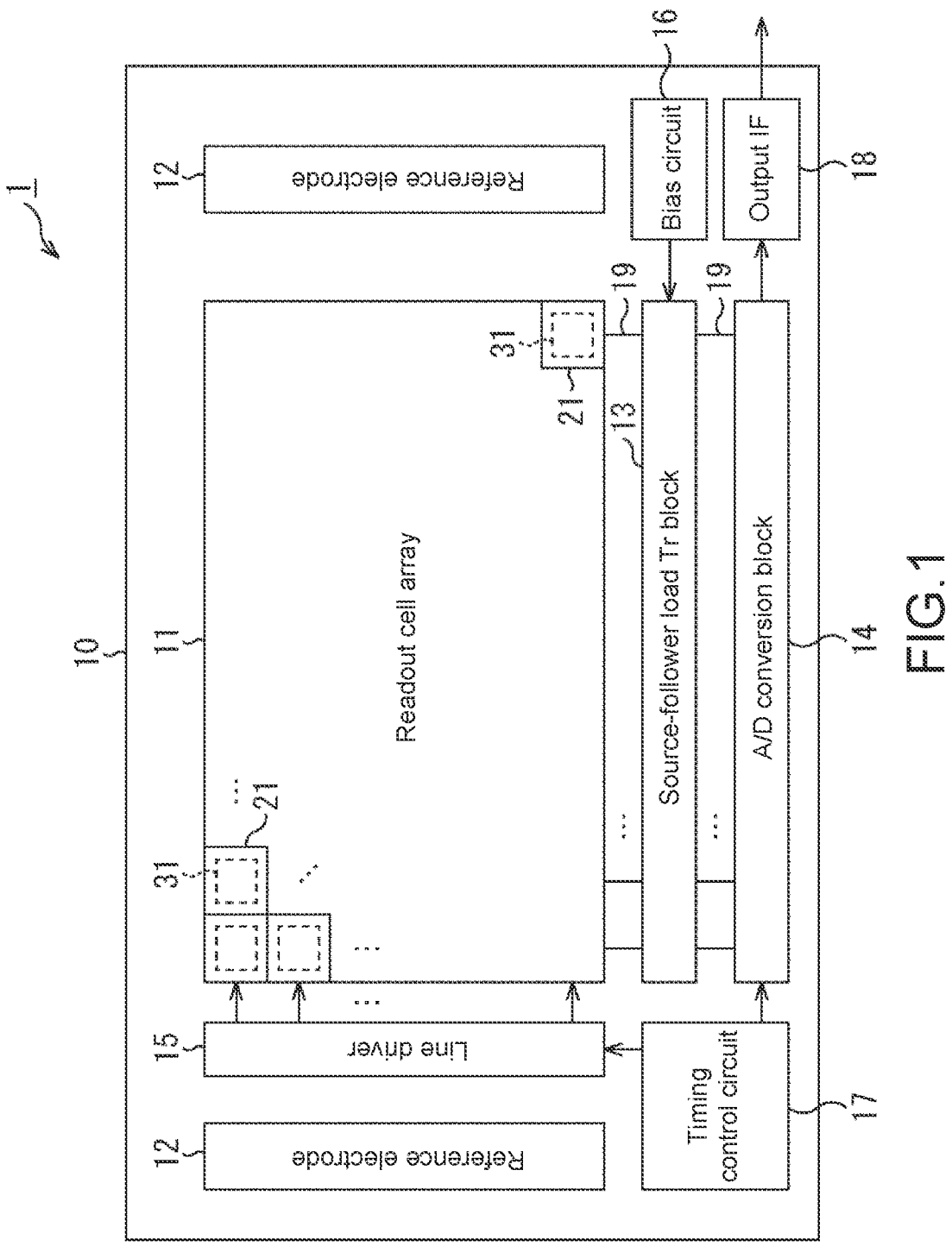
FIG. 1 is a block diagram showing a configuration example of a potential measuring device according to a first embodiment of the present disclosure.

FIG. 1 is a block diagram showing a configuration example of a potential measuring device according to a first embodiment of the present disclosure.

A potential measuring device 1 in FIG. 1 is, for example, a device that measures a potential signal such as an action potential AP generated by a living cell in a culture solution and a local field potential LFP that is a signal of a frequency lower than that of the action potential AP.

The potential measuring device 1 includes, on one substrate 10, a readout cell array 11, a reference electrode 12, a source-follower load Tr block 13, an A/D conversion block 14, a line driver 15, a bias circuit 16, a timing control circuit 17, an output IF 18, and the like.

The readout cell array 11 includes readout cells 21 two-dimensionally arranged in a matrix, each of the readout cells 21 serving as a unit cell, a signal readout circuit that includes at least a readout electrode 31 being formed in each of the readout cells 21. The readout electrode 31 detects a potential, which is locally emitted by a cell, as a displacement with respect to a reference potential. Although details of the readout cell 21 will be described below with reference to FIG. 2, a signal indicating a predetermined potential detected by the readout electrode 31 (hereinafter, referred to as a potential signal) is output to the A/D conversion block 14 via a common readout signal line 19 disposed in the same column. The common readout signal line 19 is arranged in units of columns of the plurality of readout cells 21 two-dimensionally arranged in the readout cell array 11, and one common readout signal line 19 is connected to the plurality of readout cells 21 in the same column.

The reference electrode 12 is an electrode intended to apply a potential used as a reference (reference potential) to a culture solution (culture medium) of a cell to be measured, the readout cell array 11 being immersed in the culture solution. In the example of FIG. 1, two reference electrodes 12 are disposed outside the readout cell array 11 so as to interpose the readout cell array 11 therebetween.

The source-follower load Tr block 13 includes a load transistor 61 (FIG. 3) that constitutes a source-follower together with an amplifier transistor 33 (FIG. 2) in the readout cell 21.

The A/D conversion block 14 converts an analog potential signal read by the source-follower from each of the readout cells 21 in the respective rows of the readout cell array 11 into a digital value. For example, the A/D conversion block 14 includes a single-slope column-parallel A/D converter commonly used in a CMOS image sensor and performs A/D conversion on an analog potential signal output from each of the readout cells 21 in a predetermined row selected by the line driver 15. Further, in the case where the line driver 15 sets the output unit of a potential signal to the readout cells 21 in a plurality of rows, the A/D conversion block 14 may convert analog potential signals of the readout cells 21 in the plurality of rows selected simultaneously into digital values.

The line driver 15 drives each of the readout cells 21 in the readout cell array 11. For example, the line driver 15 performs control (driving) of reading the potential signal of each of the readout cells 21 in units of rows. The bias circuit 16 generates a predetermined bias voltage or a predetermined bias current and supplies the generated bias voltage or current to the respective units that requires it. For example, the bias circuit 16 generates a predetermined bias voltage Vbias and supplies the generated bias voltage Vbias to each load transistor 61 (FIG. 3) in the source-follower load Tr block 13.

The timing control circuit 17 generates and supplies a clock signal and a timing signal necessary for a predetermined operation on the basis of a master clock of a predetermined frequency. For example, the timing control circuit 17 generates a timing signal necessary for driving the A/D conversion block 14 and the line driver 15. The output IF 18 performs predetermined signal processing as necessary on the AD-converted potential signal supplied from the A/D conversion block 14 and then outputs the obtained signal to the outside. The output IF 180 performs, for example, only buffering or performs various types of digital signal processing such as column variation correction in some cases.

Figure 2:
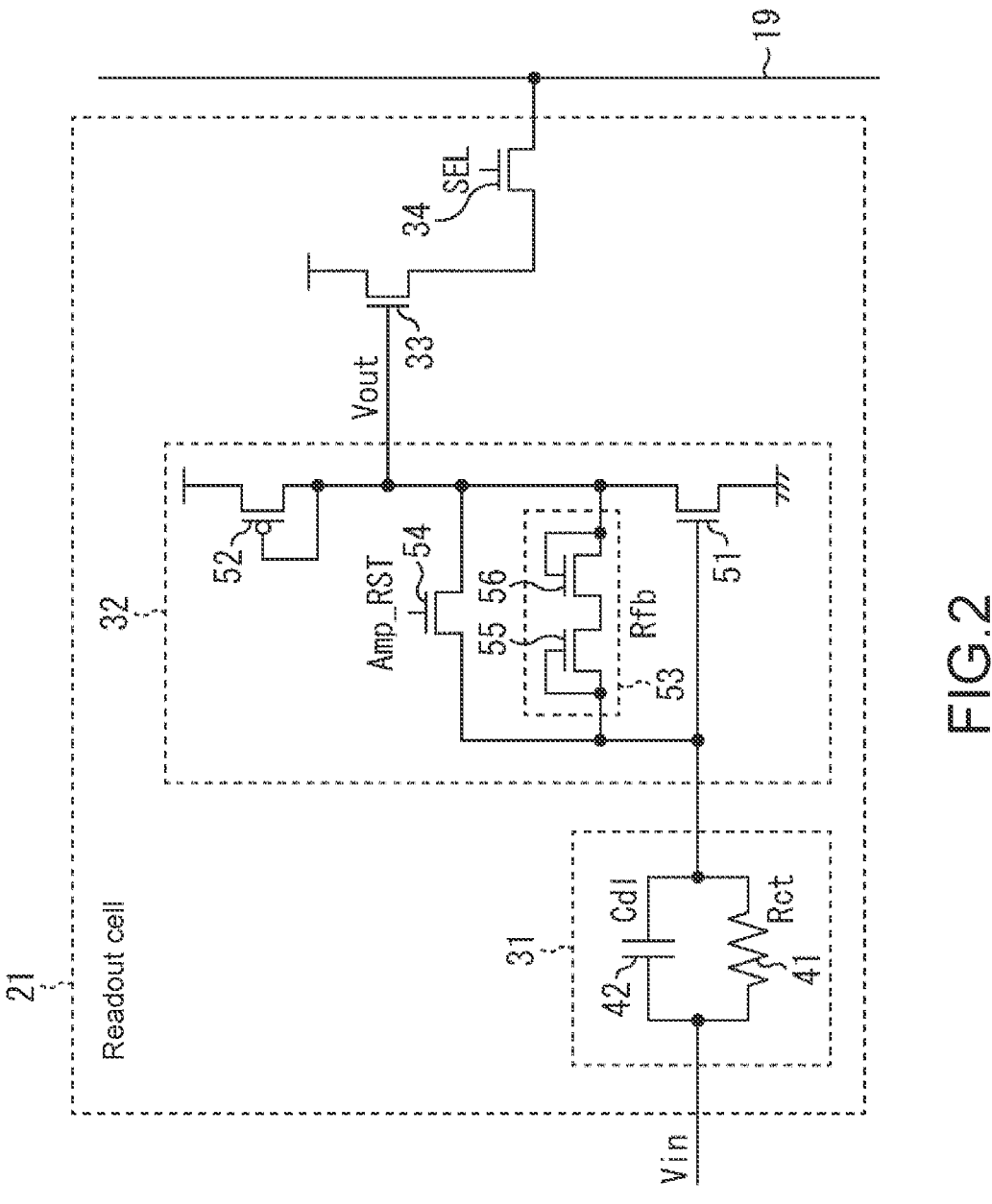
FIG. 2 is a diagram showing a circuit configuration example of a readout cell.

FIG. 2 shows a circuit configuration example of the readout cell 21.

The readout cell 21 includes the readout electrode 31, an amplifier circuit 32, the amplifier transistor 33, and a selection transistor 34. Each of the amplifier transistor 33 and the selection transistor 34 includes, for example, an NMOS transistor (N-type MOS transistor). Here, the amplifier transistor 33 is an amplifier transistor of a source-follower, the amplifier transistor and the load transistor in the source-follower load Tr block 13 constituting the source-follower. The amplifier transistor 33 will be referred to as the source-follower amplifier transistor 33 in order to easily distinguish it from the amplifier transistor 51 described below.

The readout electrode 31 detects a predetermined potential as a displacement with respect to a reference potential. The readout electrode 31 is represented by a simple equivalent circuit model in which a charge transfer resistor 41 and an electric double layer capacitor 42 are connected in parallel. The resistance value of the charge transfer resistor 41 is defined as Rct and the capacitance of the electric double layer capacitor 42 is defined as Cdl. A potential signal Vin indicating minute potential fluctuations with respect to a reference potential is read by the readout electrode 31 and input to the amplifier circuit 32.

The amplifier circuit 32 includes a common-source amplifier that includes the amplifier transistor 51 and a load transistor 52, and a high resistance element 53 and an initialization switch 54 connected in parallel between the input node and the output node of the common-source amplifier. The amplifier transistor 51 includes an NMOS transistor whose source is AC-grounded and the load transistor 52 includes a diode-connected PMOS transistor (P-type MOS transistor).

The input node of the amplifier circuit 32 is connected to the readout electrode 31 and the output node of the amplifier circuit 32 is connected to the gate of the source-follower amplifier transistor 33. The amplifier circuit 32 amplifies the potential signal Vin of the minute potential supplied to the input node and outputs a resultant potential signal Vout to the gate of the source-follower amplifier transistor 33.

By using the diode-connected PMOS transistor as a load of the common-source amplifier, it is possible to prevent the open loop gain of the amplifier circuit 32 from becoming too high, e.g., suppress the open loop gain to approximately 30 times, and prevent useless use of the operation range of the A/D converter of the A/D conversion block 14 (column-parallel A/D converter).

The high resistance element 53 is a feedback resistor that feeds back the output of the common-source amplifier to the input, and includes the two diode-connected NMOS transistors 55 and 56 connected back-to-back (alternately connected in series). With this configuration, it is possible to easily achieve a high resistance in the order of teraohm (TΩ) in a small area. Here, the resistance value of the high resistance element 53 is defined as Rfb. Note that the high resistance element 53 can include two or more diode-connected NMOS transistors, e.g., the high resistance element 53 may include a total of four NMOS transistors in which two units of two diode-connected NMOS transistors connected in series are connected back-to-back.

The initialization switch 54 includes an NMOS transistor and is turned on in response to a reset signal Amp_RST supplied to the gate to connect the input node and the output node of the amplifier circuit 32 to each other. This initialization switch 54 may be omitted. In the case where the initialization switch 54 is omitted, it is necessary to stand by for a certain amount of time until a predetermined bias voltage corresponding to ta threshold value as the common-source amplifier is applied to the input node of the amplifier circuit 32 via the high resistance element 53 (hereinafter, referred to as a steady state). The initialization switch 54 is turned on immediately after the potential measuring device 1 is started to short-circuit the input node and the output node of the amplifier circuit 32 with a low resistance, making it possible to immediately change the state to the steady state.

The source-follower amplifier transistor 33 constitutes a source-follower together with the load transistor 61 (FIG. 3) in the source-follower load Tr block 13 connected via the common readout signal line 19. The selection transistor 34 is a switch that controls the connection with the common readout signal line 19 and is turned on in accordance with a selection signal SEL when the readout cell 21 is selected to connect the output node (source) of the source-follower amplifier transistor 33 and the common readout signal line 19. In the case where the selection transistor 34 is turned on, the potential signal Vout detected by the readout cell 21 is output to the A/D converter (not shown) in the A/D conversion block 14 via the common readout signal line 19.

Figure 3:
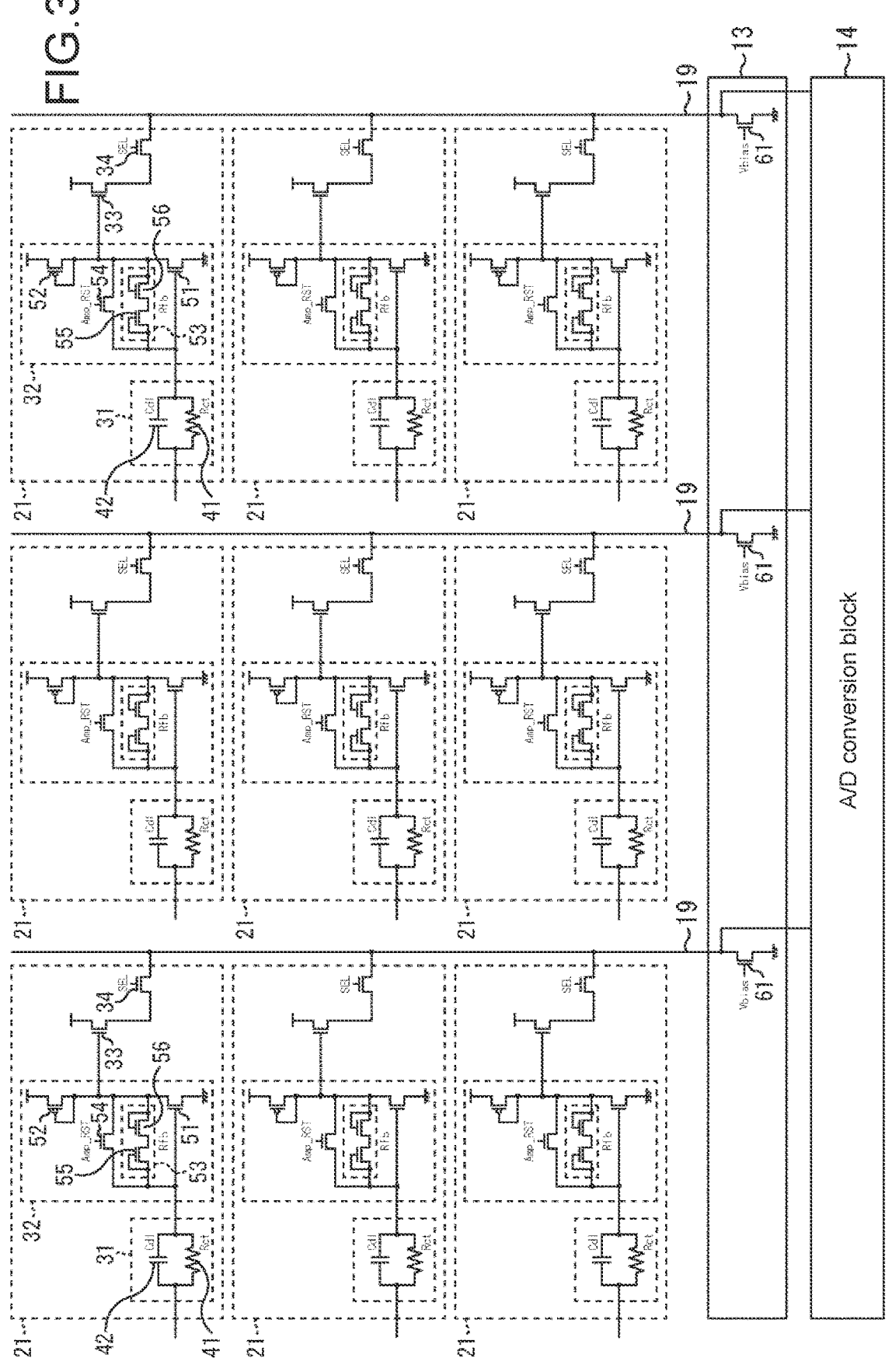
FIG. 3 is a diagram showing connection between respective readout cells and a source-follower load Tr block.

The connection between each of the readout cells 21 in the readout cell array 11 and the load transistor 61 in the source-follower load Tr block 13 is as shown in FIG. 3.

As shown in FIG. 3, one common readout signal line 19 is disposed for the plurality of readout cells 21 in the same column in the readout cell array 11 and the connection with the common readout signal line 19 disposed in the same column is controlled by the selection transistor 34.

In other words, the source-follower amplifier transistor 33 and the selection transistor 34 are interposed between the output of the amplifier circuit 32 of each of the readout cells 21 and the common readout signal line 19, and thus, the output of the amplifier circuit 32 of each of the readout cells 21 and the common readout signal line 19 can be disconnected by the selection transistor 34.

An operation of the potential measuring device 1 will be described with reference to a simple timing chart of FIG. 4.

First, immediately after the potential measuring device 1 is started, as an initialization phase, the reset signal Amp_RST is set to High and the initialization switch 54 of each of the readout cells 21 in the readout cell array 11 is turned on. As a result, the input and output of the amplifier circuit 32 are short-circuited with a low resistance, and thus, the amplifier circuit 32 is quickly set to the initial steady state. After a certain period of time, the reset signal Amp_RST is changed to Low, the initialization switch 54 is turned off, and thus, the initialization phase ends.

After the initialization phase ends, the amplifier circuit 32 of each of the readout cells 21 amplifies the potential signal Vin indicating minute potential fluctuations received by the readout electrode 31 and transfers it to the source-follower amplifier transistor 33.

A read operation of the first frame is started. That is, the line driver 15 controls the selection transistor 34 of each of the readout cells 21 in the first row of the readout cell array 11 to be turned on to connect each of the readout cells 21 in the first row to the common readout signal line 19. As a result, the potential signal Vout of each of the readout cells 21 in the first row is output to the common readout signal line 19 via the source-follower amplifier transistor 33. After ensuring a sufficient settling period of a signal in the common readout signal line 19, the column-parallel A/D converter of the A/D conversion block 14 converts the analog potential signal Vout input via the common readout signal line 19 into digital data (A/D conversion) and outputs the obtained data. Next, the line driver 15 controls the selection transistor 34 of each of the readout cells 21 in the second row to be turned on and the potential signal Vout of each of the readout cells 21 in the second row is converted into digital data and output. The same is repeated for the third and subsequent rows, and the output of the first frame ends when the potential signal Vout of each of the readout cells 21 in the N-th row that is the last row is converted into digital data and output.

Next, a read operation of the second frame is started. That is, similarly to the above-mentioned first frame, the line driver 15 selects the readout cells 21 in the readout cell array 11 in order from the first row in units of rows and the potential signal Vout of each of the readout cells 21 in the first row to the N-th row is converted into digital data and output. The same applies to the third and subsequent frames.

When the line driver 15 sequentially selects (row-scans) the readout cells 21 in the readout cell array 11 in units of rows as described above, the potential signal Vout of each of a large number of readouts cell 21 constituting the readout cell array 11 can be output.

<Transfer Function>

Figure 5:
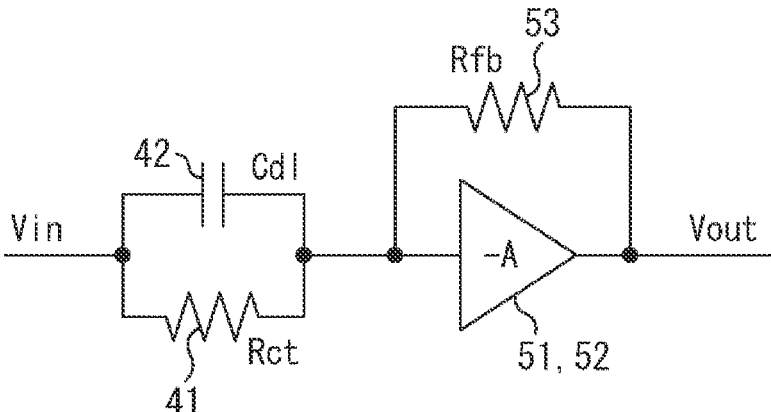
FIG. 5 is a schematic diagram showing a readout electrode and an amplifier circuit.

Next, a transfer function from the potential signal Vin of the readout electrode 31 to the potential signal Vout that is an input of the source-follower amplifier transistor 33 will be examined. FIG. 5 is a schematic diagram showing the readout electrode 31 and the amplifier circuit 32, and the open loop gain of the common-source amplifier including the amplifier transistor 51 and the load transistor 52 is defined as A.

The relationship between Vin and Vout can be represented as follows.

$$\frac{V_{out}}{V_{in}} = -\frac{R_{fb}A}{R_{fb} + R_{ct}(1+A)} \cdot \frac{1 + sR_{ct}C_{dl}}{1 + s\dfrac{R_{fb}R_{ct}C_{dl}}{R_{fb} + R_{ct}(1+A)}} \qquad \text{[Math. 1]}$$

Here, in a low frequency region where the signal frequency is extremely smaller than $\tfrac{1}{2}\pi R_{ct}C_{dl}$, the relationship between Vin and Vout can be represented by $$\frac{V_{out}}{V_{in}} \approx -\frac{R_{fb}A}{R_{fb} + R_{ct}(1+A)}. \qquad \text{[Math. 2]}$$

Further, in the case where the relationships of A>>1 and A>>Rfb/Rc are established, the relationship between Vin and Vout can be represented by $$\frac{V_{out}}{V_{in}} \approx -\frac{R_{fb}}{R_{ct}}. \qquad \text{[Math. 3]}$$

Meanwhile, in a high frequency region where the signal frequency is extremely larger than (Rfb+Rct (1+A))/2πRfbRctCdl, the relationship between Vin and Vout is represented by $$\frac{V_{out}}{V_{in}} \approx -A. \qquad \text{[Math. 4]}$$

Figure 6:
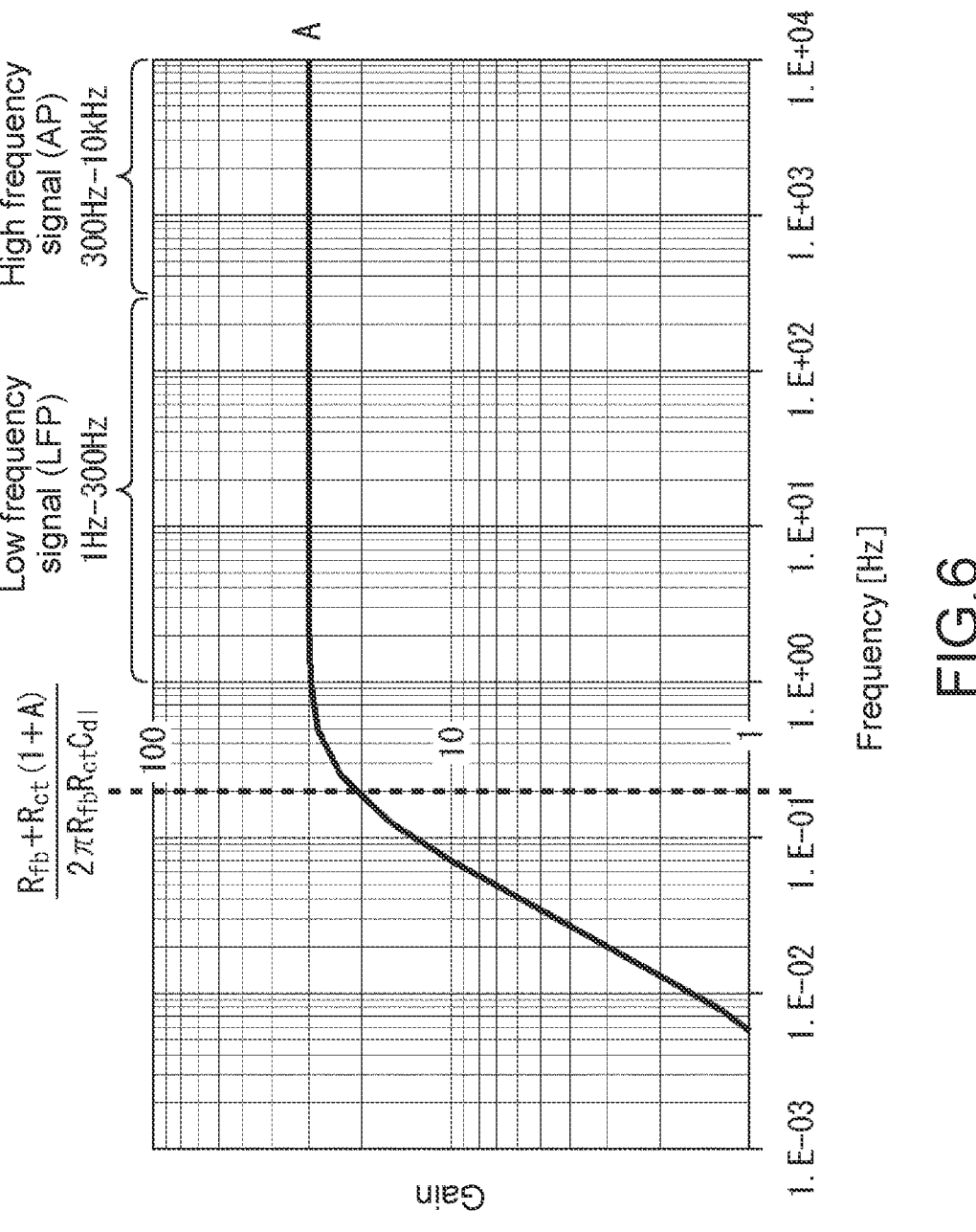
FIG. 6 is a diagram showing an example of frequency properties of the amplifier circuit.

That is, in the case where the signal frequency is extremely larger than (Rfb+Rct (1+A))/2nRfbRctCdl, the frequency properties of the amplifier circuit 32 combined with the equivalent circuit of the readout electrode 31 show high-pass filter (HPF) properties for amplifying a signal of a cut-off frequency or more with the open loop gain A of the amplifier circuit 32, the cut-off frequency being a frequency calculated by (Rfb+Rct(1+A))/27RfbRctCdl, as shown in FIG. 6. Therefore, by setting respective parameters such that the open loop gain can be achieved with signal frequency bands of approximately 1 Hz to 300 Hz, it is possible to simultaneously acquire the local field potential LFP and the action potential AP with signal frequency bands of approximately 300 Hz to 10 kHz. Note that the frequency properties in FIG. 6 show an example calculated with Cdl=5 nF, Rfb=5 GΩ, Rct=10 GΩ, and A=30.

<Configuration of Multiple Electrodes>

Although the configuration in which one readout electrode 31 is provided in one readout cell 21 is shown in the above-mentioned example, a plurality of the readout electrodes 31 may be provided.

Figure 7:
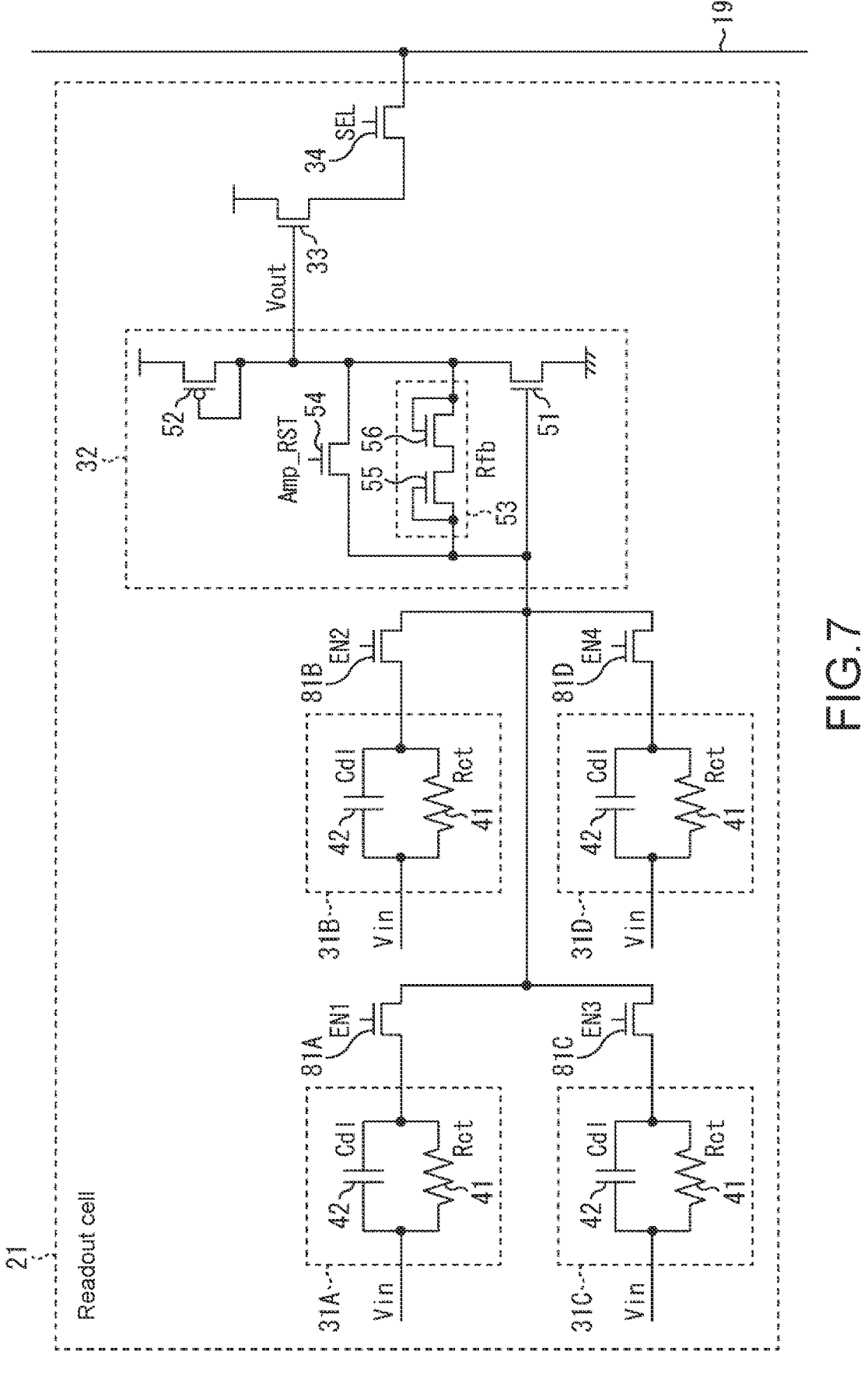
FIG. 7 is a diagram showing an example of a case where a readout cell includes a plurality of readout electrodes.

FIG. 7 shows a configuration example of the readout cell 21 in the case where a plurality of the readout electrodes 31 is provided in one readout cell 21.

In FIG. 7, four readout electrodes 31A to 31D are provided in one readout cell 21 and the four readout electrodes 31A to 31D are connected to the input node of the amplifier circuit 32 via connection switching transistors 81A to 81D, respectively. Each of the connection switching transistors 81A to 81D is a switch for switching the connection with the amplifier circuit 32 and includes an NMOS transistor.

The line driver 15 controls connection enable signals EN1 to EN4 to be supplied to the gates of the connection switching transistors 81A to 81D to control the connection between the readout electrodes 31A to 31D and the amplifier circuit 32. The turning on/off of the connection switching transistors 81A to 81D can be arbitrarily combined with each other.

For example, in the case where all the connection switching transistors 81A to 81D are turned on, the four readout electrodes 31A to 31D can be treated as one pseudo large electrode. Meanwhile, in the case where one of the connection switching transistors 81A to 81D is turned on, a signal from a cell can be received by a small electrode. Further, it is also possible to sequentially turn on the connection switching transistors 81A to 81D in a time-sharing manner and sequentially acquire signals of the four readout electrodes 31A to 31D. By arbitrarily combining the turning on/off of the connection switching transistors 81A to 81D with each other in this way, it is possible to flexibly set the size of a readout electrode in accordance with the user's needs.

<Other Configuration Examples of Amplifier Circuit>

Other configuration examples of the amplifier circuit 32 will be described with reference to FIG. 8 to FIG. 10. Note that in FIG. 8 to FIG. 10, portions common to those in FIG. 2 are denoted by the same reference symbols and description of the portions is appropriately omitted.

Figure 8:
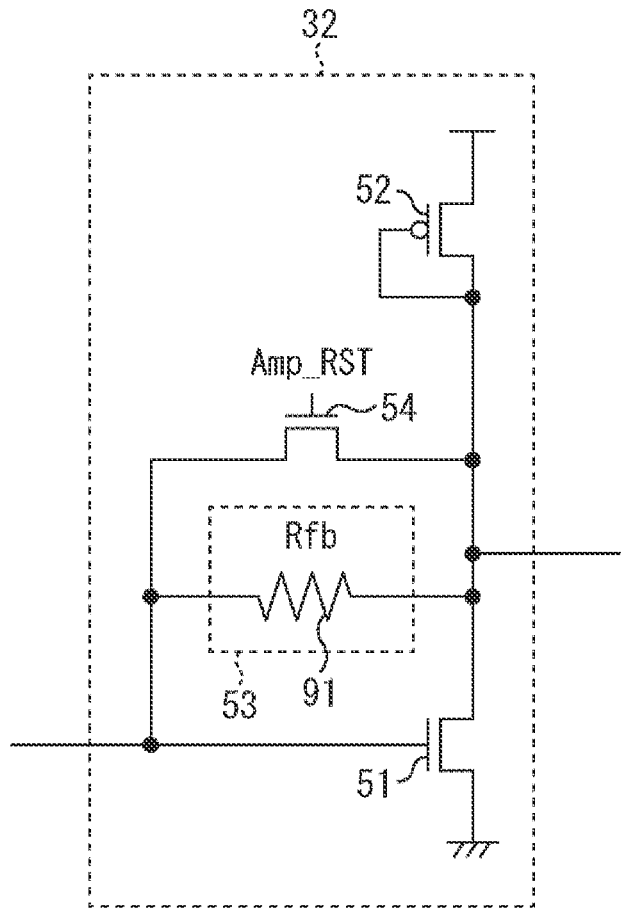
FIG. 8 is a diagram showing a different first configuration example of the amplifier circuit.

FIG. 8 shows a different first configuration example of the amplifier circuit 32.

In the different first configuration example shown in FIG. 8, as the high resistance element 53, a resistance element 91 using a polysilicon resistor or a diffusion resistor is used. In other words, the amplifier circuit 32 in FIG. 8 has a configuration in which the resistance element 91 using a polysilicon resistor or a diffusion resistor is employed instead of the diode-connected NMOS transistors 55 and 56 connected back-to-back in FIG. 2.

Figure 9:
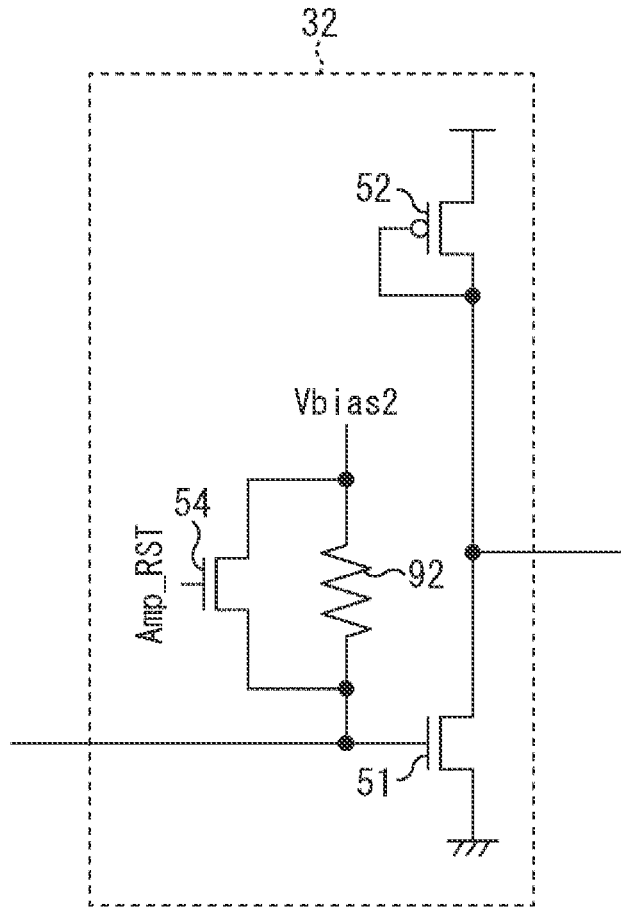
FIG. 9 is a diagram showing a different second configuration example of the amplifier circuit.

FIG. 9 shows a different second configuration example of the amplifier circuit 32.

In the different second configuration example shown in FIG. 9, a configuration in which a predetermined bias voltage Vbias2 is applied to the input node of the amplifier circuit 32 via a high resistance element 92 is adopted. The high resistance element 92 may have a configuration in which two or more diode-connected NMOS transistors are connected back-to-back as shown in FIG. 2 or may include a silicon resistor or a diffusion resistor as shown in FIG. 8. Further, the initialization switch 54 is provided in parallel with the high resistance element 92 and the bias voltage Vbias2 can be immediately applied to the input node of the amplifier circuit 32 in the initialization phase. This bias voltage Vbias2 is commonly used for the plurality of readout cells 21 and the bias voltage Vbias2 can be simultaneously applied to the input nodes of the amplifier circuits 32 of the plurality of readout cells 21 sharing the bias voltage Vbias2. Further, the bias voltage Vbias2 can be arbitrarily set by a user and the operating point of the common-source amplifier can be set with a degree of freedom.

Figure 10:
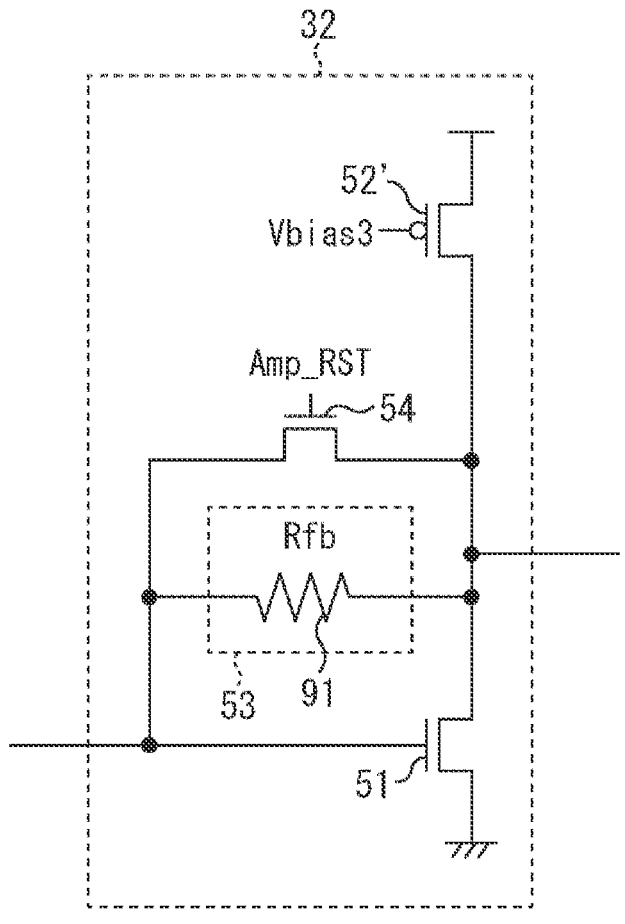
FIG. 10 is a diagram showing a different third configuration example of the amplifier circuit.

FIG. 10 shows a different third configuration example of the amplifier circuit 32.

The different third configuration example shown in FIG. 10 shows a configuration in which the diode-connected load transistor 52 that is the load of the common-source amplifier of the amplifier circuit 32 shown in FIG. 8 is replaced with a load transistor 52', a predetermined bias voltage Vbias3 being applied to the gate of the load transistor 52'. As described above, a PMOS transistor serving as a load of a common-source amplifier does not necessarily need to be diode-connected and the predetermined bias voltage Vbias3 may be applied to the gate of the PMOS transistor.

2. COMPARISON WITH SEPARATION CONFIGURATION DISCLOSED IN PATENT LITERATURE 2

In the above-mentioned Patent Literature 2, with a configuration in which the potential signal Vin detected by a readout electrode is amplified by a differential amplifier circuit and output, high resolution and low noise have been achieved by separately disposing a readout cell and a reference cell constituting a differential amplifier circuit to minimize the number of components necessary in the readout cell region and dispose a large number of readout cells and increasing the area of an amplifier transistor.

In the configuration disclosed in Patent Literature 2, in a reference cell, a reference potential is held by a sample-and-hold capacitor in the reference cell. Since a considerable amount of leakage current is generated in this sample-and-hold capacitor and the operating point shifts over time, it is necessary to perform an operation of refreshing the reference potential (auto-zero operation) at regular intervals. For this reason, there has been a problem that a signal of a frequency band lower than the frequency of the auto-zero operation cannot be acquired. For example, there has been a problem that only a signal of a frequency up to approximately 100 Hz can be acquired as a signal of a low frequency.

In this regard, a configuration in which a low frequency signal of 100 Hz or less can be acquired while solving the problem of the shift of an operating point due to a leakage current by connecting a high resistance element in the order of teraohm (TΩ) instead of a switch circuit AZ-SW that controls the auto-zero operation and constantly applying a reference potential in terms of DC is conceivable.

However, when this configuration is adopted, potentials over a wide area cannot be simultaneously acquired. That is, in the configuration disclosed in Patent Literature 2, a switch circuit SEL-SW that selects a cell has been provided in each of a readout cell and a reference cell and control of switching the connection between a common readout signal line extending in the longitudinal direction and each cell in units of rows has been performed.

In the case of simply considering a configuration in which a high resistance element is used instead of the switch circuit AZ-SW that controls the auto-zero operation, the feedback configuration with the high resistance element breaks down as soon as the connection with the common readout signal line by the switch circuit SEL-SW that selects a cell is cut off. As a result, a reference voltage cannot be constantly applied in terms of DC and a correct signal cannot be acquired. Therefore, with the configuration based on the differential amplifier circuit in Patent Literature 2, both acquisition of a low frequency signal and acquisition of potential signals in a wide area by row-scanning using the switch circuit SEL-SW cannot be achieved.

The above-mentioned problem that row-scanning using the switch circuit SEL-SW cannot be performed in the circuit configuration in which a high resistance element is used to constantly apply a reference potential in terms of DC occurs because the output node of an amplifier to which the high resistance element is connected and the common readout signal line are integrated.

In this regard, the above-mentioned potential measuring device 1 is configured so that the output of the amplifier circuit 32 and the common readout signal line 19 can be separated from each other by interposing the circuit of the source-follower between the output of the amplifier circuit 32 and the common readout signal line 19.

Further, since a differential amplifier circuit in which a readout cell and a reference cell are disposed separately from each other as in that in Patent Literature 2 cannot be employed, the amplifier circuit 32 needs to operate alone as an amplifier whose input and output are constantly connected with a high resistance. For this reason, the readout cell 21 maintains the low noise performance without increasing the cell area by using, as the amplifier circuit 32, a single common-source amplifier having the minimum configuration. Further, a noise reduction effect obtained by reducing the number of amplifier transistors, which is the main noise source, from two to one with respect to the configuration of the differential amplifier circuit is also provided. Then, the input and output of the common-source amplifier are connected with a high resistance. With such a configuration, it is constantly biased at the threshold value of the common-source amplifier in terms of DC, and high-pass filter (HPF) properties in which a signal of the cut-off frequency or more is amplified with the open loop gain of the amplifier as shown in FIG. 6 are exhibited, considering the properties combined with the equivalent circuit of the electrode connected to the input.

The gain variation deteriorates when the configuration of a differential amplifier circuit of a closed loop in which the gain is determined by the capacitance ratio is changed to the configuration of a single common-source amplifier using an open loop gain for signal amplification. However, from the viewpoint of signal sensitivity, for the purpose of measuring signals of neurons, the sensitivity variation that depends on the cell culture condition on the electrode is generally dominant and the gain variation of the amplifier is considered acceptable. If necessary, the gain variation of each of the readout cells 21 may be measured in advance and the acquired data may be corrected by signal processing.

Therefore, in accordance with the potential measuring device 1, it is possible to avoid the problem that scanning cannot be performed in the circuit configuration in which a high resistance element is used to constantly apply a reference potential in terms of DC and maintain the low noise performance. That is, it is possible to acquire the local field potential LFP of low-frequency bands of approximately 1 Hz to 300 Hz in addition to the action potential AP of high-frequency bands while maintaining the high resolution, the wide area, and the low noise performance equivalent to those in Patent Literature 2.

3. SECOND EMBODIMENT OF POTENTIAL MEASURING DEVICE

Figure 11:
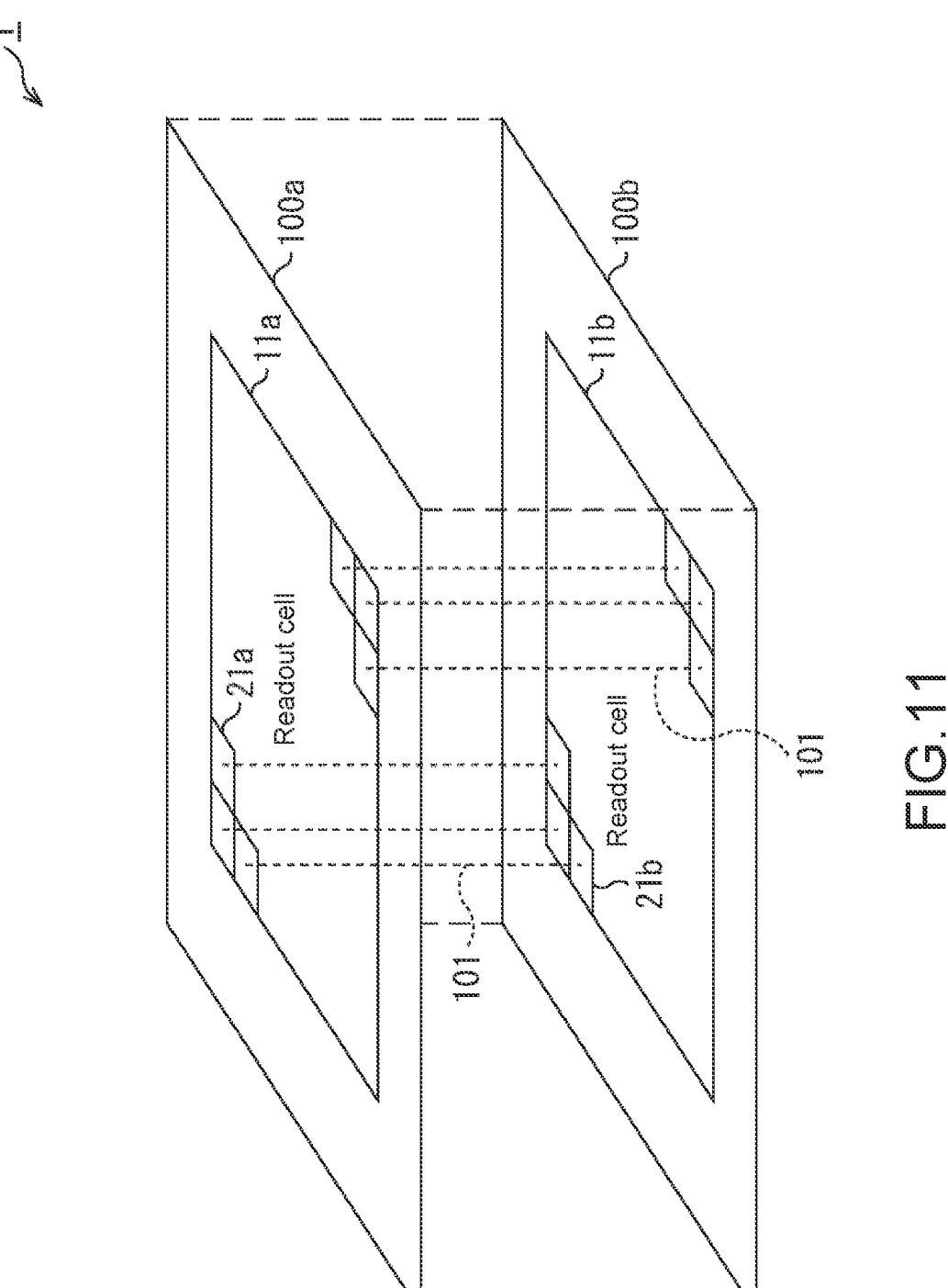
FIG. 11 is a block diagram showing a configuration example of a potential measuring device according to a second embodiment of the present disclosure.

FIG. 11 is a block diagram showing a configuration example of a potential measuring device according to a secondee embodiment of the present disclosure.

Also in FIG. 11 and subsequent figures, portions common to those in the above-mentioned first embodiment are denoted by the same reference symbols and description of the portions are appropriately omitted.

The potential measuring device 1 according to the first embodiment shown in FIG. 1 has included the readout cell array 11 and the like formed on one substrate 10. Meanwhile, the potential measuring device 1 according to the second embodiment includes a first substrate 100a and a second substrate 100b stacked as shown in FIG. 11.

At least a readout cell array 11a that is part of the readout cell array 11 in the first embodiment is disposed on the first substrate 100a, and at least a readout cell array 11b that is a configuration other than the readout cell array 11a is disposed on the second substrate 100b. The readout cells 21 are also divided and arranged in the readout cell array 11a of the first substrate 100a and the readout cell array 11b of the second substrate 100b.

In FIG. 11, portions of the readout cells 21 arranged in the readout cell array 11a of the first substrate 100a are referred to as readout cells 21a, and portions of the readout cells 21 arranged in the readout cell array 11b of the second substrate 100b are referred to as readout cells 21b.

The readout cell 21a of the first substrate 100a and the readout cell 21b of the second substrate 100b, which constitute one readout cell 21, are arranged at positions overlapping with each other in plan view. The readout cell 21a and the readout cell 21b are electrically connected to each other via a connection 101 such as a metal bonding such as a Cu—Cu bonding.

Figure 12:
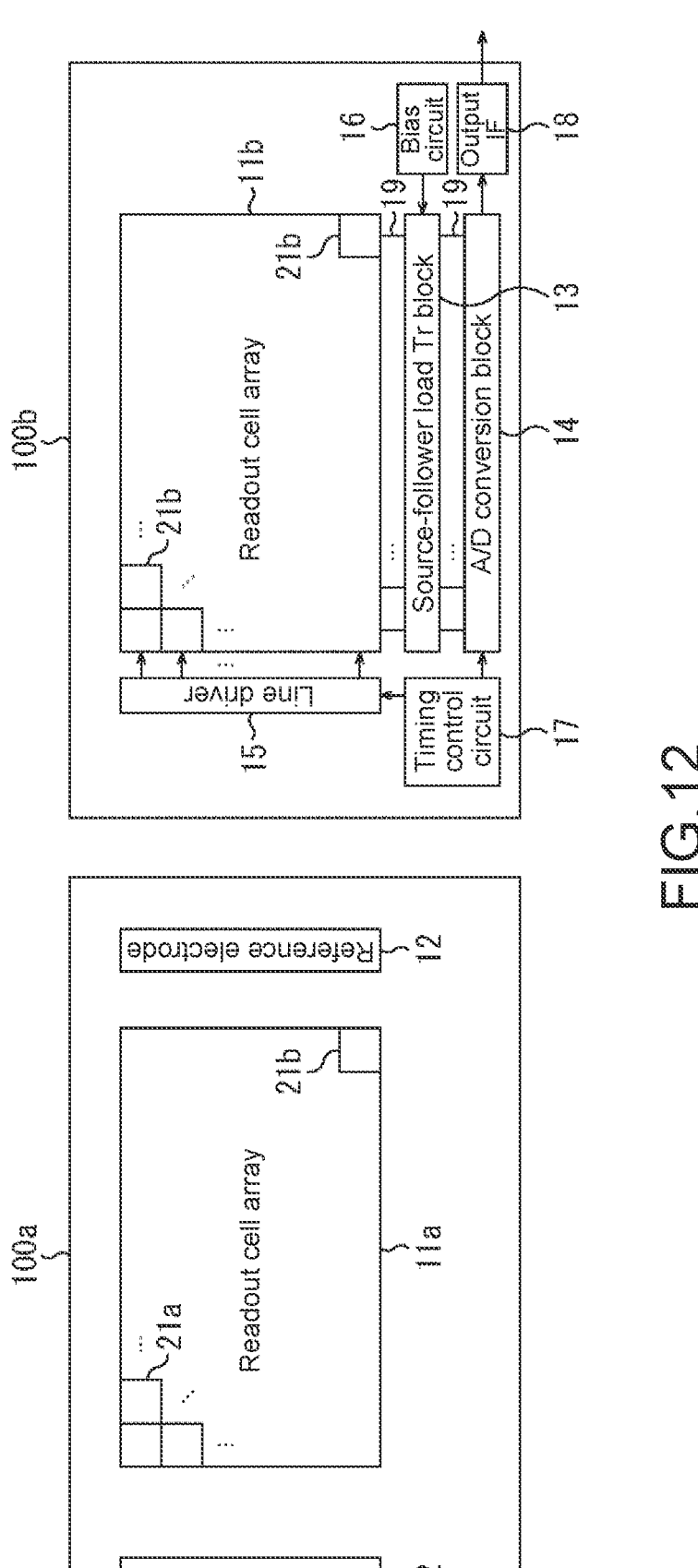
FIG. 12 is a block diagram showing a more detailed configuration example of a first substrate and a second substrate.

FIG. 12 is a block diagram showing a more detailed configuration example of the first substrate 100a and the second substrate 100b shown in FIG. 11.

The readout cell array 11a and the reference electrode 12 are disposed on the first substrate 100a. A plurality of readout cells 21a is two-dimensionally arranged in a matrix in the readout cell array 11a.

Meanwhile, the readout cell array 11b, the source-follower load Tr block 13, the A/D conversion block 14, the line driver 15, the bias circuit 16, the timing control circuit 17, the output IF 18, and a plurality of the common readout signal lines 19 are disposed on the second substrate 100b.

Figure 13:
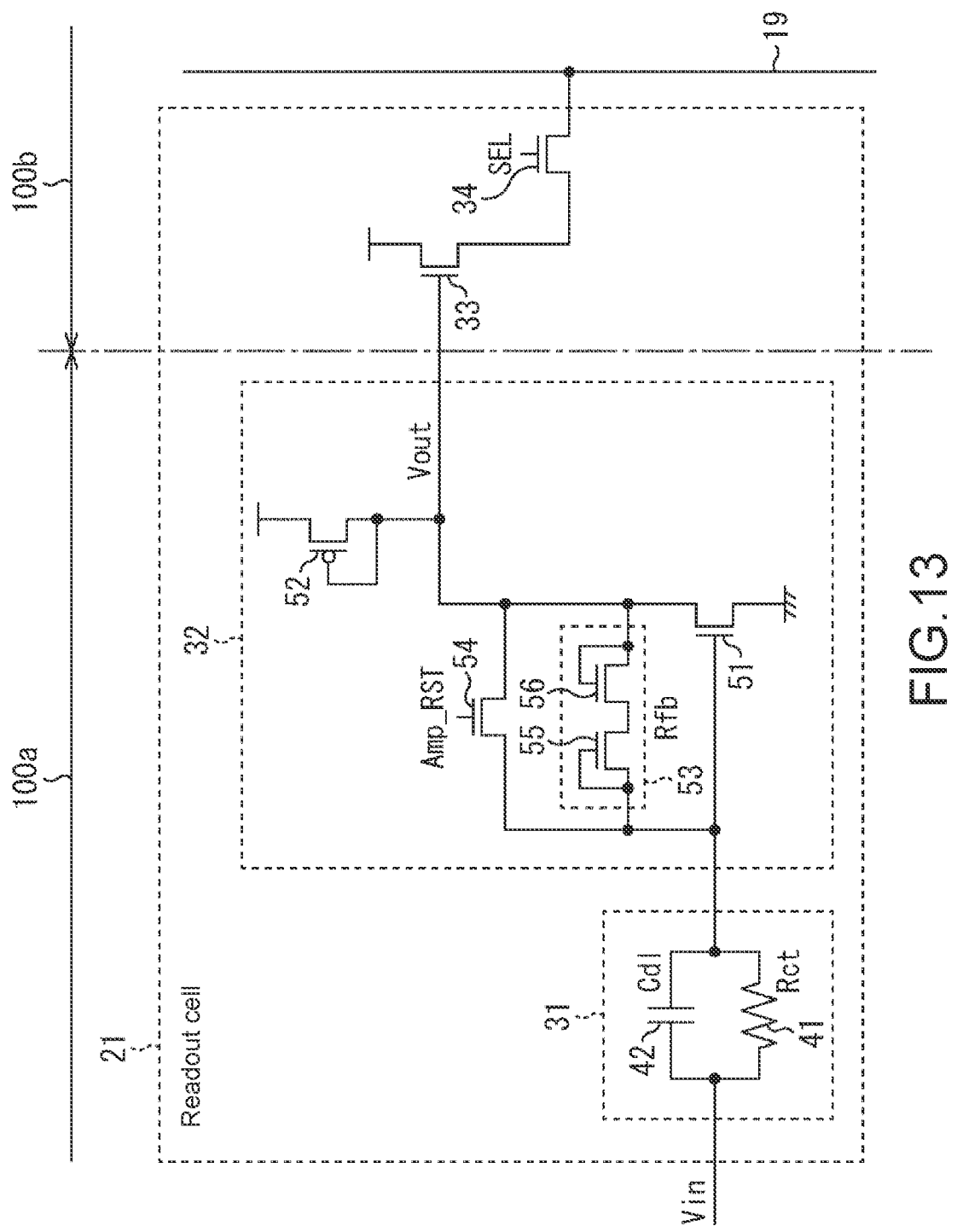
FIG. 13 is a diagram showing a first divided disposition example of readout cells.

FIG. 13 shows a first divided disposition example when the readout cell 21 is divided into readout cells and arranged on the first substrate 100a and the second substrate 100b.

The one-dot chain line in FIG. 13 indicates the boundary between the first substrate 100a and the second substrate 100b.

In the first divided disposition example in FIG. 13, of the readout electrode 31, the amplifier circuit 32, the source-follower amplifier transistor 33, and the selection transistor 34 constituting one readout cell 21, the readout electrode 31 and the amplifier circuit 32 are disposed on the first substrate 100a and the source-follower amplifier transistor 33, the selection transistor 34, and the common readout signal line 19 are disposed on the second substrate 100b.

Figure 14:
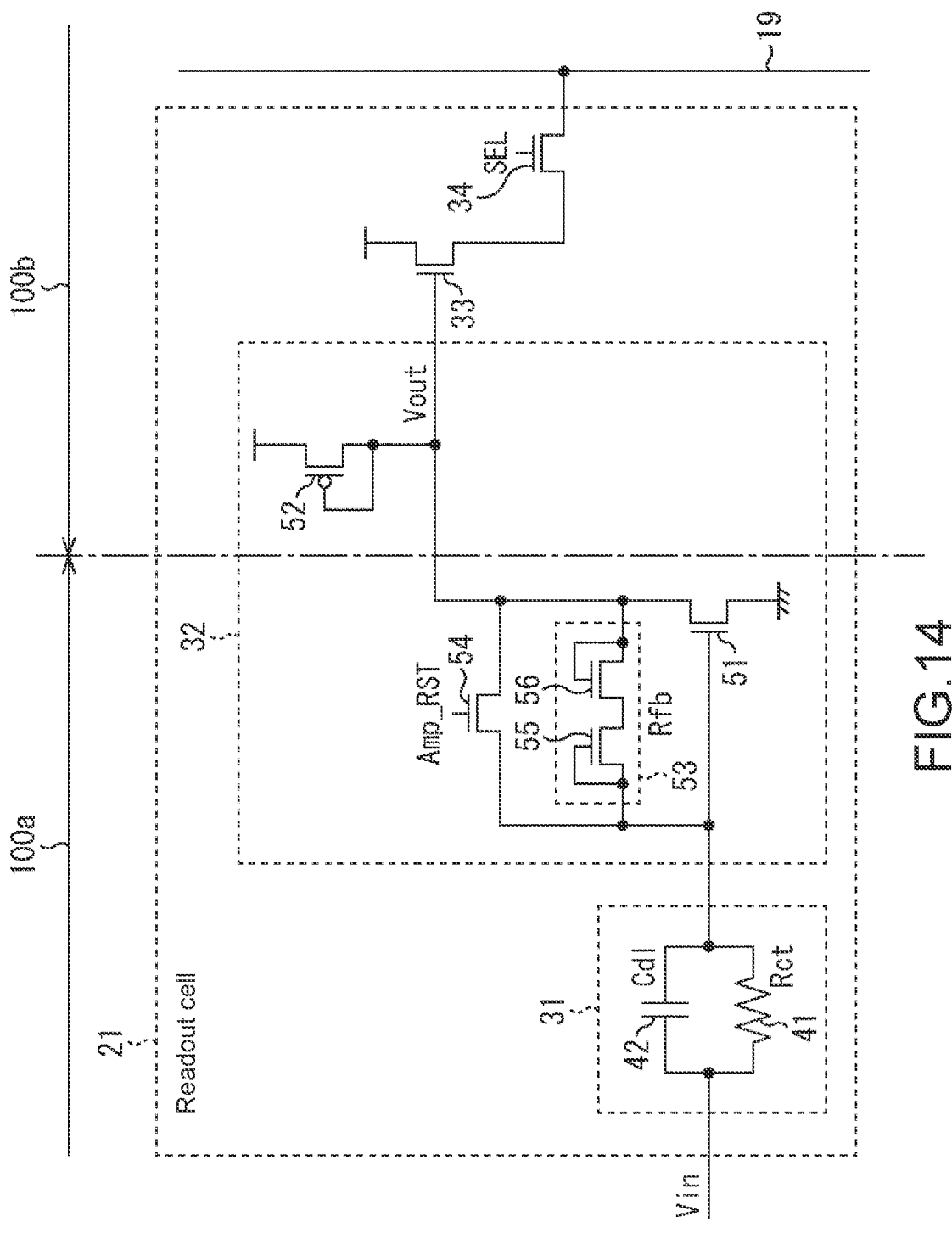
FIG. 14 is a diagram showing a second divided disposition example of readout cells.

FIG. 14 shows a second divided disposition example of the readout cells 21. Also in FIG. 14, the one-dot chain line indicates the boundary between the first substrate 100a and the second substrate 100b.

In the second divided disposition example in FIG. 14, the readout electrode 31 and the amplifier transistor 51, the high resistance element 53, and the initialization switch 54 of the amplifier circuit 32 are disposed on the first substrate 100a, and the load transistor 52 of the amplifier circuit 32, the source-follower amplifier transistor 33, the selection transistor 34, and the common readout signal line 19 are disposed on the second substrate 100b.

Figure 15:
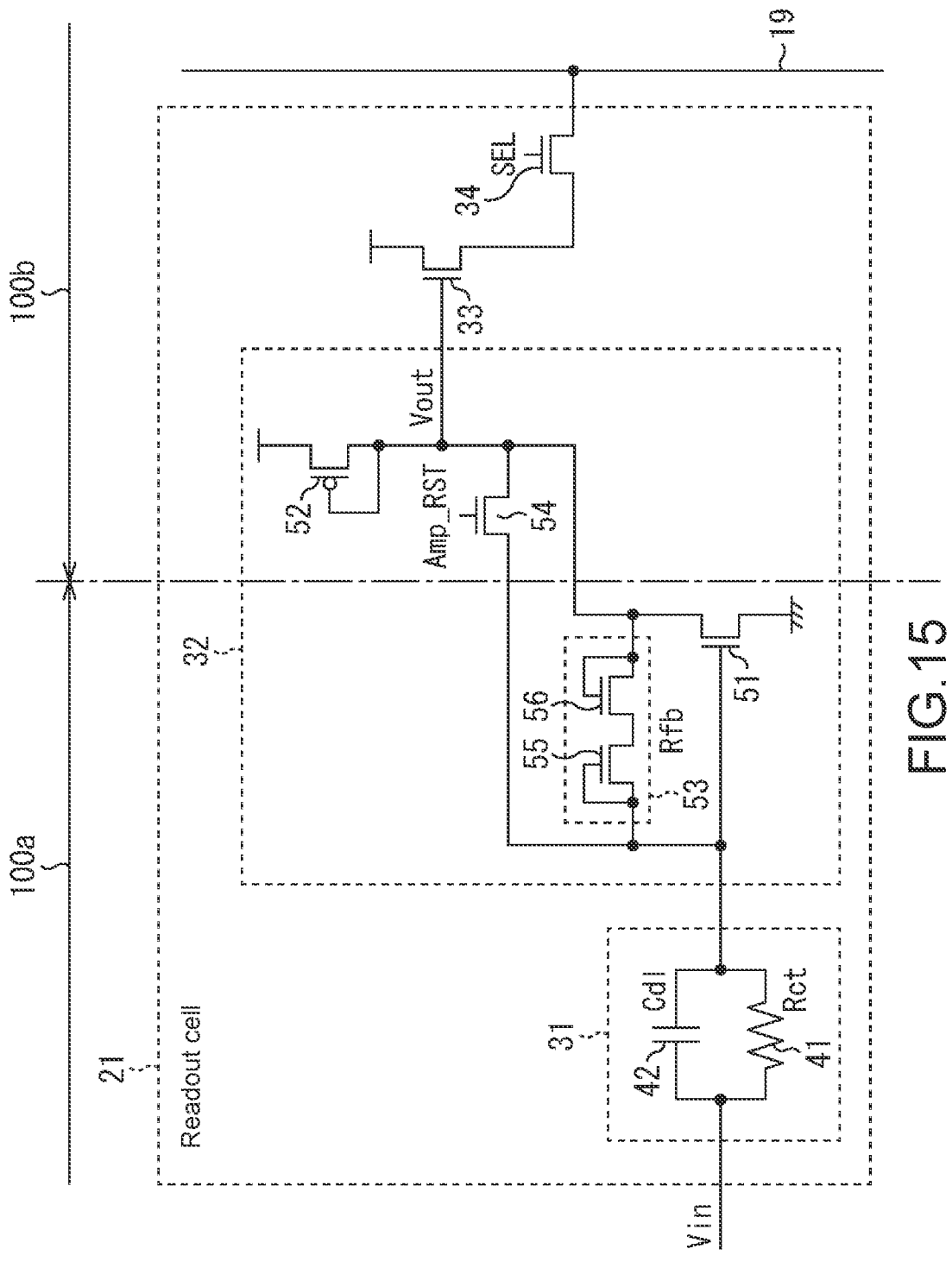
FIG. 15 is a diagram showing a third divided disposition example of readout cells.

FIG. 15 shows a third divided disposition example of the readout cells 21. Also in FIG. 15, the one-dot chain line indicates the boundary between the first substrate 100a and the second substrate 100b.

In the third divided disposition example in FIG. 15, the readout electrode 31 and the amplifier transistor 51 and the high resistance element 53 of the amplifier circuit 32 are disposed on the first substrate 100a, and the load transistor 52 and the initialization switch 54 of the amplifier circuit 32, the source-follower amplifier transistor 33, the selection transistor 34, and the common readout signal line 19 are disposed on the second substrate 100b.

In accordance with the second embodiment described above, since the configurations of the readout electrode 31 and the amplifier circuit 32 of each of the readout cells 21 are similar to those in the above-mentioned first embodiment, it is possible to achieve both the local field potential LFP and the action potential AP while maintaining the high resolution, the wide area, and the low noise performance as described with reference to FIG. 5 and FIG. 6.

In accordance with the stacked structure of the first substrate 100a and the second substrate 100b, which is employed as the second embodiment, since the number of elements to be disposed on the respective substrates 100 can be reduced, it is possible to arrange a larger number of readout cells 21 as compared with that in the configuration of one substrate. That is, higher resolution and wider area can be achieved. Further, since MOS transistors having an amplification function and a larger transistor size can be disposed, lower noise can be achieved.

Further, in the first divided disposition example and the second divided disposition example in FIG. 13 and FIG. 14, it is possible to reduce the number of electrical connection points between the first substrate 100a and the second substrate 100b in each of the readout cells 21 to one.

Meanwhile, in the third divided disposition example in FIG. 15, although the number of electrical connection points between the first substrate 100a and the second substrate 100b in each of the readout cells 21 is two, the number of elements to be disposed on the first substrate 100a can be further reduced by disposing the load transistor 52 and the initialization switch 54 on the side of the second substrate 100*b*, and thus, the transistors size of the amplifier transistor 51 of the common-source amplifier can be increased, achieving low noise.

4. THIRD EMBODIMENT OF POTENTIAL MEASURING DEVICE

Figure 16:
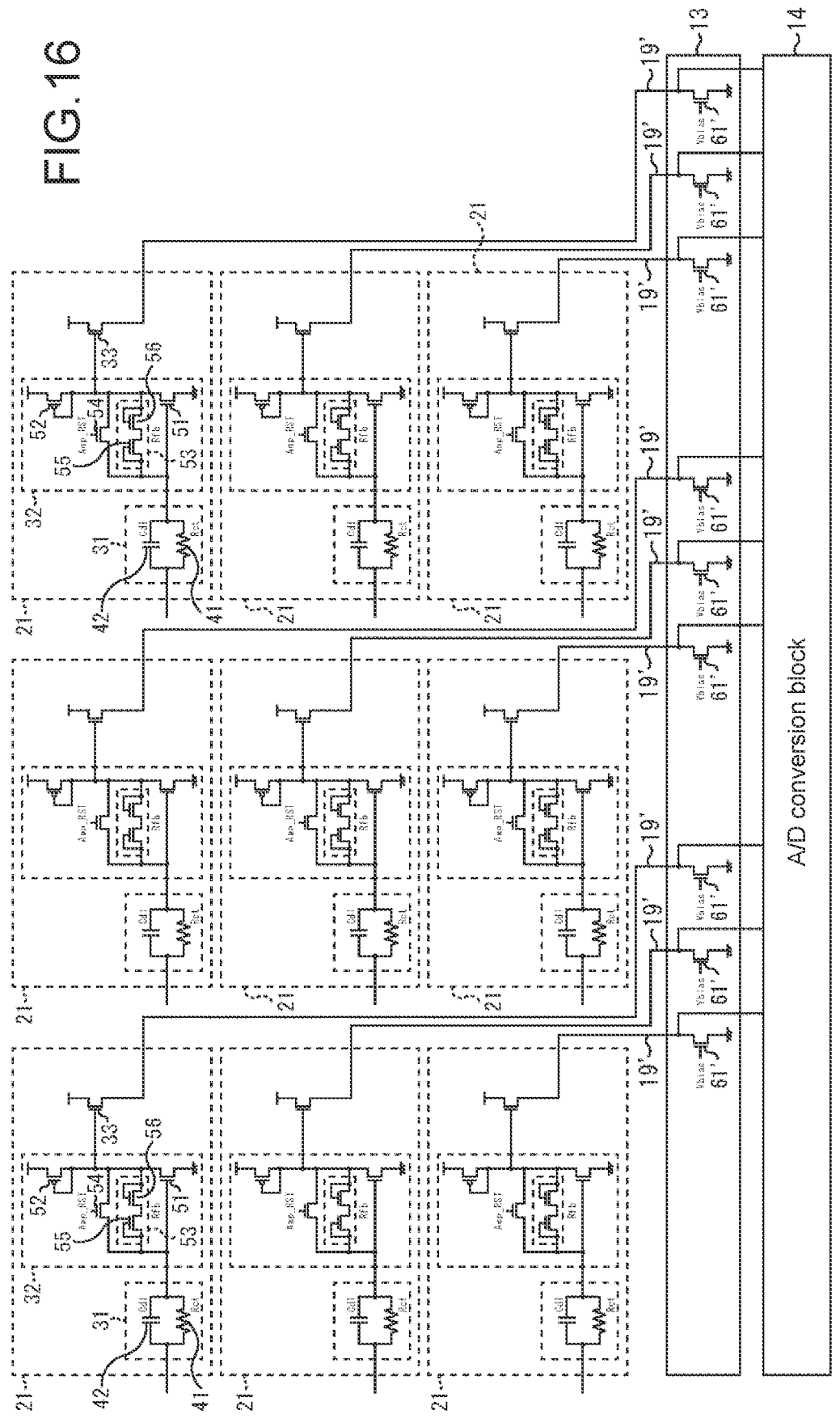
FIG. 16 is a block diagram showing a configuration example of a potential measuring device according to a third embodiment of the present disclosure.

FIG. 16 is a block diagram showing a configuration example of a potential measuring device according to a third embodiment of the present disclosure.

FIG. 16 is a diagram corresponding to FIG. 3 showing the above-mentioned first embodiment, portions corresponding to those in FIG. 3 are denoted by the same reference symbols, and description of the portions is appropriately omitted.

When comparing the third embodiment in FIG. 16 with the first embodiment shown in FIG. 3, the selection transistor 34 of each of the readout cells 21 is omitted and the one common readout signal line 19 used commonly for the plurality of readout cells 21 arranged in the same column is replaced with a readout signal line 19'.

In other words, the output of the source-follower amplifier transistor 33 of each of the readout cells 21 arranged in the same column in the readout cell array 11 is connected to a load transistor 61' of the source-follower load Tr block 13 and (the A/D converter of) the A/D conversion block 14 through the individual readout signal line 19'.

While the number of load transistors 61' of the source-follower load Tr block 13 is the same as the number of columns of the readout cell 21 in the first embodiment, the number of load transistors 61' is the same as the number of readout cells 21 in the readout cell array 11 in the third embodiment in FIG. 16.

In accordance with the third embodiment in FIG. 16, since the configurations of the readout electrode 31 and the amplifier circuit 32 of each of the readout cells 21 are similar to those in the above-mentioned first and second embodiments, it is possible to achieve both the local field potential LFP and the action potential AP while maintaining the high resolution, the wide area, and the low noise performance as described with reference to FIG. 5 and FIG. 6.

In the third embodiment in FIG. 16, the source-follower that includes the source-follower amplifier transistor 33 and the load transistor 61' has an effect of reading, from the readout cell 21, the potential signal Vout transmitted through the readout signal line 19' extending in the column direction at high speed.

In accordance with the configuration in FIG. 16, although the number of readout signal line 19', the number of load transistors 61', and the number of A/D converters increase, reading of all the readout cells 21 in the readout cell array 11 can be simultaneously performed, and thus, it is possible to speed up the reading. Note that it does not necessarily need to simultaneously perform reading of all the readout cells 21 in the readout cell array 11 and an arbitrary readout cell 21 can be selected and driven, thereby providing variations in driving.

Note that in the configuration example in FIG. 16, although the load transistor 61' of the source-follower load Tr block 13 and the A/D converter of the A/D conversion block 14 are provided in one-to-one correspondence with each of the readout cells 21 in the readout cell array 11, it is not necessarily need to be the same as the number of readout cells 21. For example, one load transistor 61' and one A/D converter may be shared by the plurality of readout cells 21 in the same column and may be switched and operated in a time-sharing manner.

Further, although the third embodiment in FIG. 16 is an example of being disposed on one substrate 10 corresponding to the first embodiment shown in FIG. 3, the configuration shown in FIG. 16 may be adopted for the stacked structure of the first substrate 100*a* and the second substrate 100*b* as in the second embodiment. Further, the amplifier circuit 32 may be replaced with that in the different first to third configuration examples shown in FIG. 8 to FIG. 10.

5. CONCLUSION

The potential measuring device 1 according to each of the above-mentioned embodiments is capable of acquiring a low frequency signal of approximately 1 Hz to 300 Hz with low noise in addition to a high frequency signal of approximately 300 Hz to 10 k Hz by connecting the output node of the readout electrode 31 that reads the potential of a fluctuation with respect to a reference potential to a single common-source amplifier to constantly apply a predetermined bias voltage to the input node of the common-source amplifier. As a result, in the case of measuring the potential generated by a living cell in a culture solution, it is possible to acquire not only the action potential AP but also the local field potential LFP and the like.

In the first and second embodiments, by connecting the source-follower amplifier transistor 33 of the source-follower to the output node of the common-source amplifier and controlling the connection with the common readout signal line 19 by the selection transistor 34, each of the readout cells 21 two-dimensionally arranged in the readout cell array 11 is sequentially selected in units of rows and the potential signal Vout of each of the readout cells 21 is output. In the third embodiment, the potential signals Vout of the readout cells 21 in the readout cell array 11 are simultaneously output. In any of the embodiments, by using a single common-source amplifier having the minimum configuration, it is possible to reduce the cell area and arrange a large number of readout cells 21 (readout electrodes 31) in the readout cell array 11, thereby achieving high resolution.

Therefore, the potential measuring device 1 according to each of the above-mentioned embodiments is capable of acquiring both a low frequency signal and a high frequency signal with high resolution and low noise.

Note that although (the source-follower amplifier transistor 33) of the source-follower is disposed as a buffer circuit in the subsequent stage of the amplifier circuit 32 and the connection with the common readout signal line 19 is controlled by the selection transistor 34 in each of the above-mentioned embodiments, another buffer circuit, e.g., a voltage follower circuit may be used.

Embodiments of the present technology are not limited to the above-mentioned embodiments, and various modifications may be made without departing from the essence of the present technology.

Note that the effects described herein are merely illustrative and not restrictive, and other effects than those described herein may be exerted.

It should be noted that the present technology may take the following configurations.

(1) A potential measuring device, including:

a unit cell that includes a readout electrode for reading a predetermined potential as a displacement with respect to a reference potential, an amplifier circuit that includes a common-source amplifier, the readout electrode being connected to an input node of the common-source amplifier, a predetermined bias voltage being applied to the input node via a resistor, and a buffer circuit that is connected to an output node of the amplifier circuit.

(2) The potential measuring device according to (1) above, in which the buffer circuit is an amplifier transistor constituting a source-follower.

(3) The potential measuring device according to (2) above, in which a plurality of the unit cells in a same column is connected to one common readout signal line, the potential measuring device further including a first switch that controls connection between an output node of the amplifier transistor and the common readout signal line.

(4) The potential measuring device according to (2) above, in which the amplifier transistor of the unit cell and a load transistor constituting the source-follower are provided in one-to-one correspondence.

(5) The potential measuring device according to any one of (1) to (4) above, in which the predetermined bias voltage is applied to the input node of the common-source amplifier by connecting the input node and the output node of the amplifier circuit to each other via the resistor.

(6) The potential measuring device according to any one of (1) to (5) above, further including a second switch that connects the input node and the output node of the amplifier circuit, the second switch being configured to be turned on immediately after the potential measuring device is started.

(7) The potential measuring device according to any one of (1) to (4) above, in which the predetermined bias voltage is commonly applied to the plurality of unit cells.

(8) The potential measuring device according to any one of (1) to (7) above, in which a load of the common-source amplifier includes a diode-connected transistor.

(9) The potential measuring device according to any one of (1) to (8) above, in which the resistor includes at least two diode-connected transistors connected back-to-back.

(10) The potential measuring device according to any one of (1) to (9) above, in which the unit cell includes a plurality of the readout electrodes, and a third switch that switches connection between the plurality of readout electrodes and the amplifier circuit.

(11) The potential measuring device according to (10) above, in which the third switch connects the plurality of readout electrodes in the unit cell in a time-sharing manner.

(12) The potential measuring device according to (10) or (11) above, in which the third switch simultaneously connects two or more readout electrodes in the unit cell.

(13) The potential measuring device according to any one of (1) to (12) above, which is configured by stacking a first substrate and a second substrate, the readout electrode and at least part of the amplifier circuit being disposed on the first substrate, an AD conversion unit that performs AD conversion on a signal output from the unit cell being disposed on the second substrate.

(14) The potential measuring device according to (13) above, in which the readout electrode and the entire amplifier circuit are disposed on the first substrate.

(15) The potential measuring device according to (13) or (14) above, in which the unit cell is divided into unit cells and arranged on the first substrate and the second substrate, and the divided unit cells disposed on the first substrate and the second substrate are electrically connected to each other by metal bonding.

REFERENCE SIGNS LIST

1 potential measuring device
10 substrate
11 readout cell array
12 reference electrode
13 source-follower load Tr block
14 A/D conversion block
15 line driver
16 bias circuit
19 common readout signal line
21, 21a, 21b readout cell
31, 31A to 31D readout electrode
32 amplifier circuit
33 amplifier transistor (source-follower amplifier transistor)
34 selection transistor
41 charge transfer resistor
42 electric double layer capacitor
51 amplifier transistor
52, 52' load transistor
53 high resistance element
54 initialization switch
55, 56 NMOS transistor
61, 61' load transistor
81A to 81D connection switching transistor
91 resistance element
92 high resistance element
100a first substrate
100b second substrate
101 connection

What is claimed is:

1. A potential measuring device, comprising:

a unit cell that includes:

a readout electrode connected directly to an input voltage for reading a predetermined potential as a displacement with respect to a reference potential;

an amplifier circuit that includes a common-source amplifier, wherein the common-source amplifier includes a first amplifier transistor and a load transistor and a high resistance element and an initialization switch connected in parallel between an input node and an output node of the common-source amplifier, wherein the readout electrode is connected to the input node of the common-source amplifier, and wherein a predetermined bias voltage is applied to the input node via the high resistance element; and a buffer circuit that is connected to the output node of the common-source amplifier.

2. The potential measuring device according to claim 1, wherein the buffer circuit is a second amplifier transistor constituting a source-follower.

3. The potential measuring device according to claim 2, wherein a plurality of the unit cells in a same column is connected to one common readout signal line, the potential measuring device further comprising a first switch that controls connection between an output node of the second amplifier transistor and the common readout signal line.

4. The potential measuring device according to claim 2, wherein the second amplifier transistor of the unit cell and a load transistor constituting the source-follower are provided in one-to-one correspondence.

5. The potential measuring device according to claim 1, wherein the predetermined bias voltage is applied to the input node of the common-source amplifier by connecting the input node and the output node of the common-source amplifier to each other via the high resistance element.

6. The potential measuring device according to claim 1, wherein the initialization switch is a second switch that connects the input node and the output node of the common-source amplifier, the second switch being configured to be turned on immediately after the potential measuring device is started.

7. The potential measuring device according to claim 1, wherein the predetermined bias voltage is commonly applied to the plurality of unit cells.

8. The potential measuring device according to claim 1, wherein the load transistor of the common-source amplifier includes a diode-connected transistor.

9. The potential measuring device according to claim 1, wherein the high resistance includes at least two diode-connected transistors connected back-to-back.

10. The potential measuring device according to claim 1, wherein the unit cell includes:

a plurality of the readout electrodes; and a third switch that switches connection between the plurality of readout electrodes and the amplifier circuit.

11. The potential measuring device according to claim 10, wherein the third switch connects the plurality of readout electrodes in the unit cell in a time-sharing manner.

12. The potential measuring device according to claim 10, wherein the third switch simultaneously connects two or more readout electrodes in the unit cell.

13. The potential measuring device according to claim 1, which is configured by stacking a first substrate and a second substrate, the readout electrode and at least part of the amplifier circuit being disposed on the first substrate, an AD conversion unit that performs AD conversion on a signal output from the unit cell being disposed on the second substrate.

14. The potential measuring device according to claim 13, wherein the readout electrode and the entire amplifier circuit are disposed on the first substrate.

15. The potential measuring device according to claim 13, wherein the unit cell is divided into unit cells and arranged on the first substrate and the second substrate, and the divided unit cells disposed on the first substrate and the second substrate are electrically connected to each other by metal bonding.

16. A potential measuring device, comprising:

a unit cell that includes:

a readout electrode for reading a predetermined potential as a displacement with respect to a reference potential;

an amplifier circuit that includes a common-source amplifier, wherein the common-source amplifier includes a first amplifier transistor and a load transistor and a high resistance element and an initialization switch connected in parallel between an input node and an output node of the common-source amplifier, wherein the readout electrode is connected to the input node of the common-source amplifier, and wherein a predetermined bias voltage is applied to the input node via the high resistance element; and a buffer circuit that is connected to the output node of the common-source amplifier.

17. The potential measuring device according to claim 16, wherein the unit cell includes:

a plurality of the readout electrodes; and a third switch that switches connection between the plurality of readout electrodes and the amplifier circuit.

18. The potential measuring device according to claim 17, wherein the third switch connects the plurality of readout electrodes in the unit cell in a time-sharing manner.

19. The potential measuring device according to claim 17, wherein the third switch simultaneously connects two or more readout electrodes in the unit cell.

20. The potential measuring device according to claim 16, which is configured by stacking a first substrate and a second substrate, the readout electrode and at least part of the amplifier circuit being disposed on the first substrate, an AD conversion unit that performs AD conversion on a signal output from the unit cell being disposed on the second substrate.

* * * * *